June 12, 1951 W. O. GEE, JR 2,556,421

RECORD PLAYER

Filed June 7, 1946 4 Sheets-Sheet 1

INVENTOR.
William O. Gee, Jr.,
BY Mueller + Mason
Attys.

June 12, 1951 W. O. GEE, JR 2,556,421

RECORD PLAYER

Filed June 7, 1946 4 Sheets-Sheet 2

INVENTOR.
William O. Gee, Jr.
BY Mueller & Mason
Atty's.

June 12, 1951 W. O. GEE, JR 2,556,421

RECORD PLAYER

Filed June 7, 1946 4 Sheets-Sheet 3

INVENTOR.
William O. Gee, Jr.,
BY Mueller & Mason
Attys.

June 12, 1951 W. O. GEE, JR 2,556,421

RECORD PLAYER

Filed June 7, 1946 4 Sheets-Sheet 4

INVENTOR.
William O. Gee, Jr.,
BY Mueller & Mason
Attys.

Patented June 12, 1951

2,556,421

UNITED STATES PATENT OFFICE 2,556,421

RECORD PLAYER

William O. Gee, Jr., Chicago, Ill., assignor to Motorola, Inc., a corporation of Illinois Application June 7, 1946, Serial No. 675,111

14 Claims. (Cl. 274—2)

The present invention relates to record players or phonographs for playing disk type records and more particularly to a phonograph or a record player in which all the operator has to do is to place the record on the turntable and close the cover of the record player or phonograph whereby the reproducing or pick-up unit is automatically moved into its correct playing position.

Perhaps the greatest objection to phonographs or record players commonly used heretofore has been the requirement of placing the pick-up unit, and particularly the stylus or needle thereof, on the record prior to reproducing or playing the same. The record as well as the needle and pick-up unit were often damaged through carelessness in performing this operation. This was especially true when small children operated the phonograph. In the first place, children encountered difficulty in properly placing the reproducing unit so that the needle engaged the desired point in the sound track of the record with the result that the record was often scratched and many times even the pick-up unit and needle were damaged. The damage to one record if it were one of a multiple record recording might render the entire recording worthless, since the replacement of one record of a multiple record recording is often very difficult if not impossible. For this reason, children were often prohibited from operating the phonograph or record player because of the possibility of damaging either the records or the phonograph itself, to say nothing of injuring themselves on the needle. It would be desirable to provide a record player or phonograph in which the positioning of the needle on the record at the beginning of the sound groove thereof occurs automatically so that all danger to the pick-up unit or record in this respect is eliminated and the phonograph can be safely operated by children.

Recently phonographs or record players have appeared on the market in which it is unnecessary to manually move the pick-up unit. However, these phonographs have been very complicated, and in addition, are usually radically different from conventional phonographs which have been used heretofore of the type where the record is manually placed on a turntable having a center post for engaging the conventional center opening in the record. It would be desirable to provide an arrangement for such a phonograph whereby the operator cannot touch the pick-up unit at all and in which the needle is positioned so that it is impossible for the operator to damage the needle or pick-up unit, and yet wherein the needle is properly positioned on the record when the phonograph is operated regardless of the size of the record.

It is an object of the present invention to provide a record player which is especially desirable for operation by children in that the possibility of scratching the record is completely eliminated.

It is another object of the present invention to provide a new and improved phonograph or record player in which the operator merely positions the record on the turntable and the pick-up unit is automatically positioned upon closing the cover or lid of the phonograph.

It is another object of the present invention to provide a radio-phonograph combination in which the pick-up unit of the phonograph is supported on a hinged cover and automatically positioned so that the stylus associated therewith engages the record in response to closing of the cover of the phonograph and in further response to the size of the record on the turntable.

It is another object of the present invention to provide a radio-phonograph combination in which the pick-up unit is completely enclosed so that the stylus is inaccessible from the standpoint of scratching the operator or being damaged by engagement with the operator or some other object.

Still another object of the present invention is to provide a phonograph in which the pick-up unit is supported by the lid or cover of the phonograph together with positioning means for automatically positioning the pick-up unit in dependence upon whether 10 or 12 inch records are placed on the turntable together with additional means for automatically positioning the pick-up unit for record sizes differing from the standard 10 or 12 inch size.

It is a further object of the present invention to provide a record player in which the stylus of the pick-up unit is retracted so as to be effectively inaccessible at all times with reference to contact with the operator or the like.

Further objects and advantages of the present invention will become apparent as the following description proceeds, and the features of novelty which characterize the present invention will be pointed out with particularity in the claims annexed to and forming a part of this specification.

For a better understanding of the present invention, reference may be had to the accompanying drawings, in which.

In practicing the invention, a pick-up unit is employed with the hinged lid of a record player cabinet in such a manner that closing the lid positions the stylus of the pick-up unit at the proper place on the record. Suitable means are provided for moving the pick-up unit to a different initial position depending upon the size of the record on the turntable and the stylus is always automatically retracted upon opening the lid.

One common form of radio-phonograph combination extensively used heretofore has comprised a cabinet with a hinged cover or lid. The phonograph is positioned in the cabinet so that the speaker and controls are at the front of the cabinet. Access to the turntable is afforded by lifting the lid or cover. It is common practice in such radio-phonographs to close the cover during the playing of the record in order to reduce the needle noise. The present invention has been illustrated as applied to such a cabinet and as will become apparent as the following description proceeds, it is essential for the cover to be closed when the record is being played. Radio-phonograph combinations embodying the present invention are no more expensive and perhaps even less expensive than similar radio-phonograph combinations used heretofore which did not have the means for automatically positioning the pick-up unit upon closing the cover of the record player. The cost of the simple mechanism required in accordance with the present invention is offset by the reduced cost of the pick-up unit which may be employed with the present invention as contrasted with the much more expensive and elaborate pick-up unit required in prior art record players.

Figure 1:
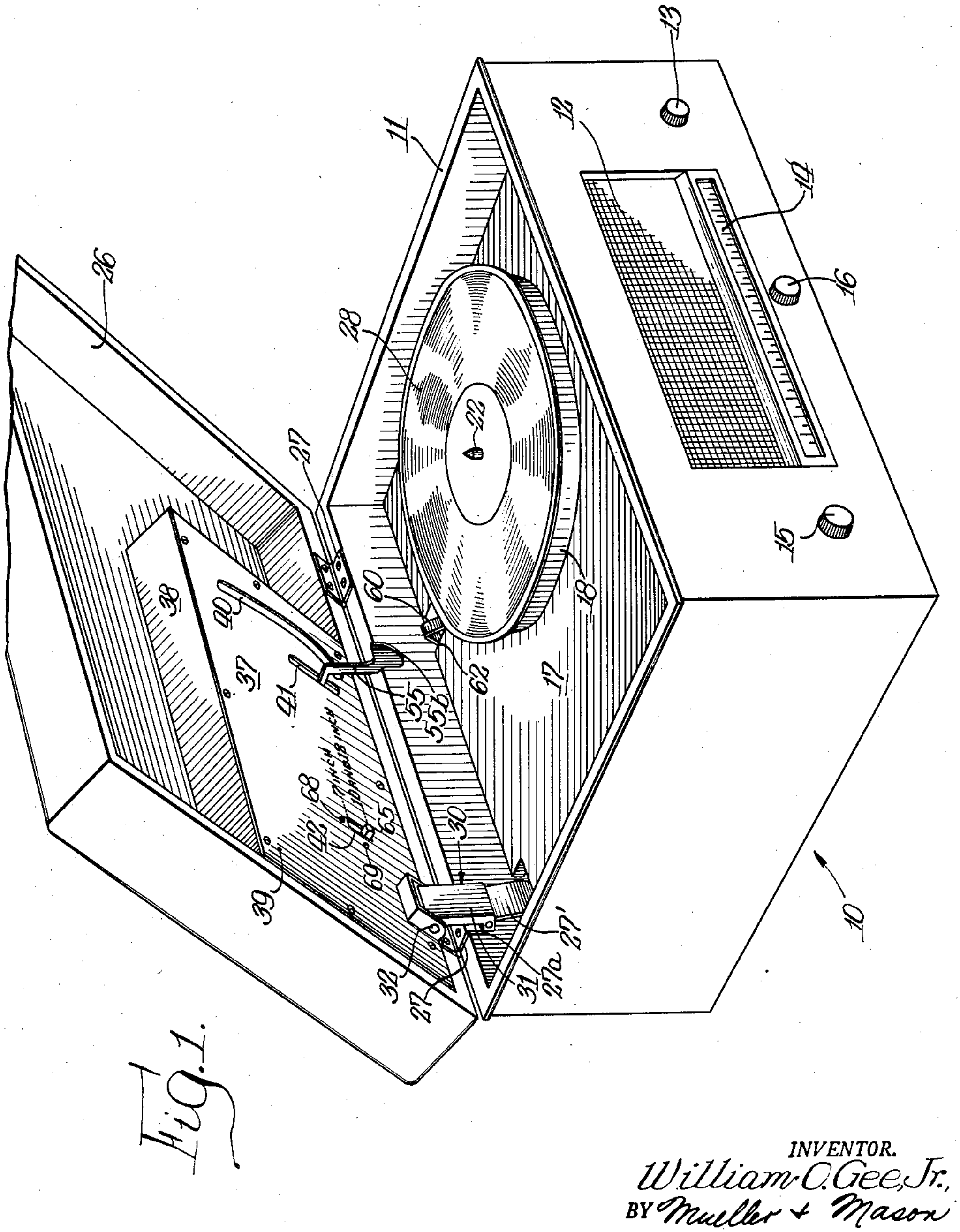
Fig. 1 is a perspective view of a radio-phonograph combination embodying the present invention.

Referring now to Fig. 1 of the drawings, there is illustrated a radio-phonograph combination generally indicated at 10, comprising a rectangular cabinet 11, which may be formed of any suitable material such as wood, metal, molded insulating material such as a suitable plastic or the like, and which may have any desired shape. Suitably mounted in the cabinet 11, but not shown in the drawings is a radio chassis and speaker the latter being positioned so that the sound therefrom may pass through the grillwork indicated at 12 at the front of the cabinet. A suitable tuning knob 13 is provided for tuning the radio receiver and for operating an indicating means which indicates on a tuning scale 14 the stations tuned in by the radio receiver. In addition, there may also be provided a volume control and an on-off switch control knob 15 illustrated at the front of the cabinet 11. Also a suitable control switch knob 16 is provided for controlling the power supplied to the turntable of the phonograph and for either connecting the radio unit or the reproducing head of the phonograph to the audio system and speaker depending upon whether the radio or the phonograph are to be operated. In other words, the knob 16 really controls a selector switch for selecting whether the phonograph or radio is to be operated. It should be understood that the grillwork, tuning dial and control knobs form no part of the present invention and any similar suitable means controlling the radio-phonograph combination may be employed.

Figures 2, 3:
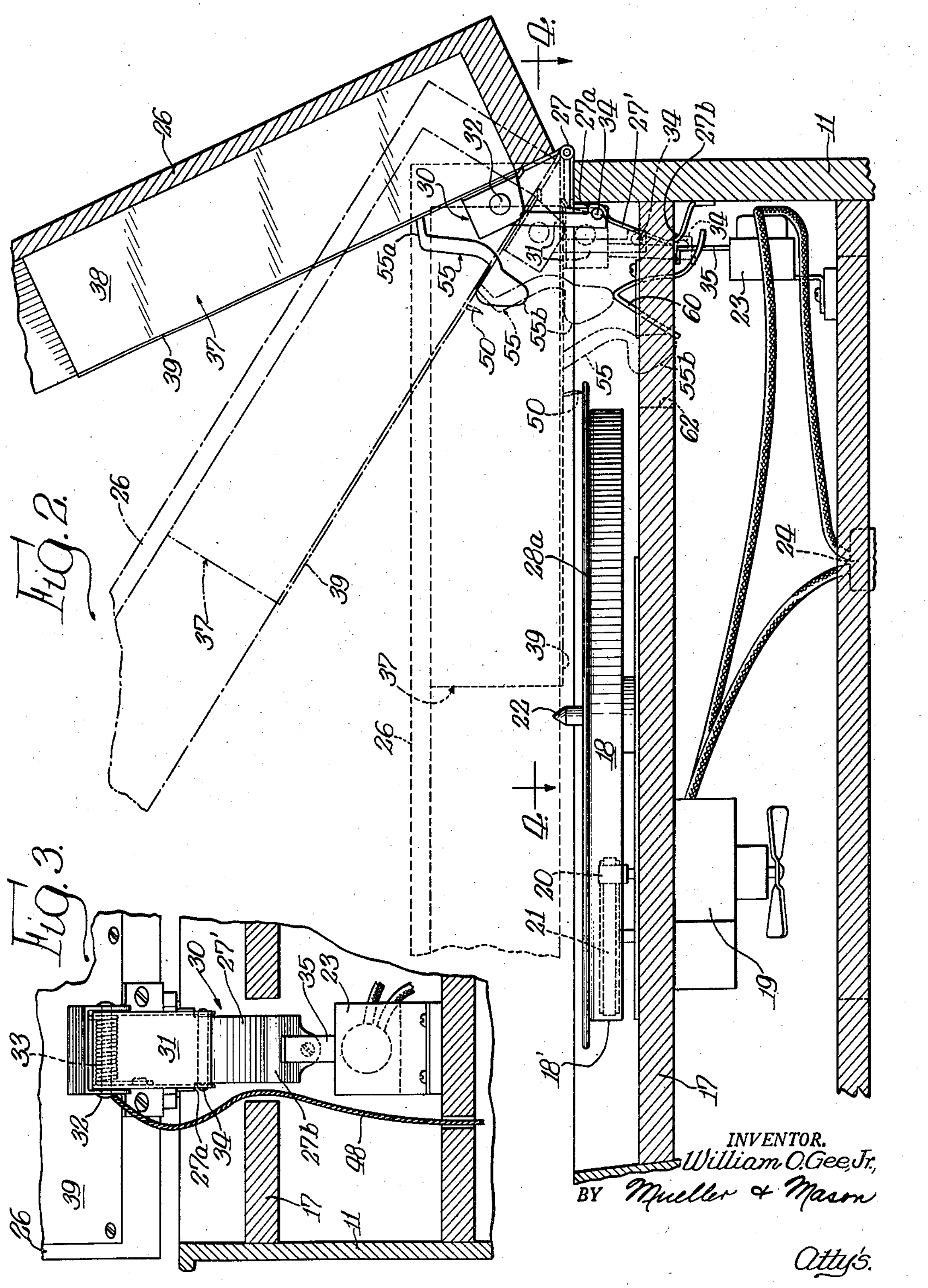
Fig. 2 is a sectional view through the record player or phonograph of Fig. 1 to illustrate the operation of the invention when a 10 inch record is placed on the turntable with the cover or lid of the phonograph shown in the fully open, the fully closed, and an intermediate position.
Fig. 3 is an enlarged view partly in section of the lid positioning device shown in Figs. 1 and 2.

Positioned within the cabinet 11 is a sub-base 17 upon which is supported a rotary turntable 18 and a suitable motor 19 for driving the same. As is best shown in Fig. 2 of the drawings, the motor 19 rotates a friction wheel 20 which in turn rotates another friction wheel 21 rotatable in frictional engagement with the skirt or rim 18′ of the turntable 18. The turntable 18 is provided with the usual record post 22 for extending into the central opening of the conventional disk type record well known to those skilled in the art. The motor 19 is connected to a source of electric power through a switch 23, which will be described hereinafter, serially connected with a selector switch 24 which is controlled by knob 16 described above. Selector switch 24 must be in the correct position determined by the position of knob 16 before power can be supplied to switch 23. In turn switch 23 must be closed before power is supplied to motor 19.

In order to close the cabinet 11 and furthermore to perform the functions to be described hereinafter there is provided a cover or lid 26 which is hinged by suitable hinge means indicated at 27 to the cabinet 11. The cover or lid 26 is hinged to the top of the cabinet so that upon opening thereof access to the turntable 18 is readily afforded whereby an operator may replace the disk record indicated at 28 in Fig. 1 of the drawings. In Fig. 2 of the drawings a 10 inch record is illustrated which is designated as 28*a* while in Fig. 5 of the drawings a 12 inch record is illustrated which is designated as 28*b*. It should be understood that the 10 and 12 inch records are the most common type of records employed, but that the radio-phonograph combination of the present invention is equally adapted to play records of other sizes such as the 6, 7 or 8 inch record. This will become apparent from the following description.

To hold the lid or cover 26 in any position either the open, the closed or any intermediate position, there is provided a lid positioner generally indicated at 30 and best shown in Figs. 1, 2 and 3 of the drawings. As illustrated this lid positioner 30 comprises an extension 27′ of one of the hinges 27 best shown in Fig. 2 of the drawings. A suitable arm 31 is pivotally mounted to the cover 26 as indicated at 32 and biased in a counter-clockwise direction as viewed in Fig. 2 by spring means 33 so that a pin 34 at the other end thereof engages with the extension 27′ of hinge 27. The extension 27′ provides an inclined surface whereby the spring 33 causes the pin 34 to be wedged thereagainst. This extension 27′ is also provided near its upper end with a shoulder portion 27*a* against which the pin 34 rests when the cover is in the fully opened position as shown in solid lines in Fig. 2 of the drawings. In addition, extension 27′ is provided with a curved or second shoulder portion 27*b* so that the pin 34 may be biased into engagement therewith when the cover is in the fully closed position as is indicated by dotted lines in the lowermost view of the pin 34 in Fig. 2 of the drawings. In addition, an intermediate position of pin 34 is also shown in Fig. 2 of the drawings with the spring 33 biasing pin 34 against the somewhat inclined surface of extension 27′ of the hinge 27. In any event, this lid positioning device is arranged to hold the lid in any position to which it is moved and is especially designed to hold the lid in the open and closed positions. It will be understood that any other suitable positioner may be employed in connection with the radio-phonograph combination of the present invention and the specific construction of the lid positioner 30 forms no part of the present invention.

Since it is desirable that the switch 23 is operated to energize the phonograph motor 19 just as the cover or lid is moved to the fully closed position the switch 23 is provided with a movable operating member 35 preferably connected to the arm 31 so that when the cover 26 is opened the switch 23 is opened and the power supply to motor 19 is cut off. Upon closing of the lid or cover 26 the operating member 35 is moved downwardly so as to close the switch 23. This is best shown in Figs. 2 and 3 of the drawings.

In accordance with the present invention there is associated with the cover 26 an enclosure 37 for housing the pick-up unit of the phonograph or record player. As is best shown in Fig. 2 of the drawings the pick-up unit is completely housed within enclosure 37 and when the cover is open as will become more apparent as the following description proceeds, the stylus of the pick-up unit is retracted so that it is impossible for the operator to damage either the needle or the pick-up unit, it being completely protected by enclosure 37. It should be understood that when the expression "stylus" or "needle" is used in the specification or claims that it is intended to include any means for transmitting the sound vibrations recorded in the record to the pick-up unit.

As is best shown in Fig. 1 of the drawings, the enclosure 37 is defined by the cover 26 and a rectangular frame 38 positioned in one corner of the cover or lid 26 which rectangular frame 38 has a depth substantially equal to the width of the peripheral flange of the cover 26. The enclosure 37 is completed by means of a plate 39. The plate 39 may be formed of any suitable material, such as metal, wood, plastic or the like and is preferably provided with an arcuate slot 40, an elongated slot 41, and a small slot 42 the purpose of which will become apparent as the following description proceeds.

Mounted within the enclosure 37 is a pick-up unit comprising an arm 43 having a cartridge or reproducing head 44 positioned at one end thereof. A U-shaped support 45 is pivotally mounted to the plate 39 as is indicated at 46 and the arm 43 is also pivotally mounted as indicated at 47 to the U-shaped pivotally mounted support 45 whereby universal movement of the cartridge 44 is permitted. The cartridge or reproducing head 44 is connected by means of a suitable electrical conductor 48 to the selector switch 24 controlled by knob 16 whereby the reproducing head 44 may be connected to the audio frequency unit including the loudspeaker of the radio not shown, or the selector switch controlled by the knob 16 may disconnect the cartridge or reproducing head 44 and instead connect the audio system including the loudspeaker with the radio circuit and antenna. It will be understood that since the pick-up unit is completely enclosed within enclosure 37 it may comprise a simple lever 43 or other suitable means for supporting the cartridge or reproducing head 44 and a considerable saving in cost is obtained by virtue of the fact that the pick-up unit need not be designed from an appearance standpoint as is generally the case with respect to prior art arrangements where the pick-up unit is plainly visible at all times. The greatly reduced cost of the pick-up unit thereby offsets the additional cost of the enclosure 37 and additional equipment to be described hereinafter.

In order to engage the sound track in the record such as 28, reproducing head or cartridge 44 is preferably provided with a permanent type stylus 50 which extends through arcuate slot 40 when the cover is moved toward the closed position. The arcuate slot 40 permits sufficient movement of the pick-up unit 43 and associated stylus 50 to take care of the entire range of movement for playing a 12 inch record. It will be obvious that as the cover is moved to the closed position gravity acting on the cartridge or reproducing head 44 will move the pick-up unit so that the stylus 50 extends through slot 40 and is in position to engage the particular record 28 on the turntable 18.

In order that the stylus 50 is retracted when the cover or lid 26 is opened to prevent injuring the operator or to prevent the operator from injuring either the needle or the pick-up unit there is provided a retracting spring 51 which interconnects a point on the arm or lever 43 intermediate the pivot 47 and the reproducing head 44 as indicated at 52 with the U-shaped member 45 as is indicated at 53. When the cover is moved to the open position the effect of gravity in moving the reproducing head or cartridge 44 so that the stylus 50 extends through the arcuate slot 40 is substantially reduced and at a certain point during the opening movement of the lid or cover 26 the force of tension spring 51 becomes greater than the effective gravitational force whereby the needle or stylus 50 is retracted from arcuate slot 40 to the position indicated in dotted lines in Fig. 5.

In order to guide the pick-up unit in this retracting movement and also to guide the pick-up unit for proper positioning of the stylus 50 at the beginning of either a 10 or 12 inch record, there is provided in accordance with the present invention a lever member 55 pivotally mounted as indicated at 56 to a member 57 fastened within the enclosure 37. This member 57 has at its lower end a right angled extension 57′ which is fastened to the plate 39 as indicated at 58 and at its upper end another right angled extension 57′′ for pivotally supporting lever 55. The pick-up unit control lever 55 has a long straight surface portion 55*a* along which the cartridge or reproducing head 44 slides when the cover is substantially in the open position in response to the forces of the tension spring 51. A suitable stop means is preferably provided for limiting the maximum retracting movement of the reproducing head 44. One such stop means is shown in dotted lines in Fig. 5 of the drawings in the form of a rod 59. However, any other suitable stop means may be employed and the rod 59 is by way of example only. The pick-up unit control lever 55 is in effect a cam follower and is provided with an end portion 55*b* having a predetermined shape which cooperates with a cam or guide member 60, in the form of a bent strip of metal or the like fastened to the sub-base 17 as is indicated at 61 and having an upwardly extending portion extending into the path of movement of the shaped portion 55*b* of the pick-up unit control lever 55. It should be understood that a slot 62 is provided in the sub-base 17 to accommodate both the pick-up unit control lever 55 and the guide 60. The shape of the guide 60 relative to the cam follower portion 55*b* is very important as will become apparent from the following description. However, the individual shapes of these cooperating members may be varied so long as the cooperative action is unchanged.

Figures 5, 6:
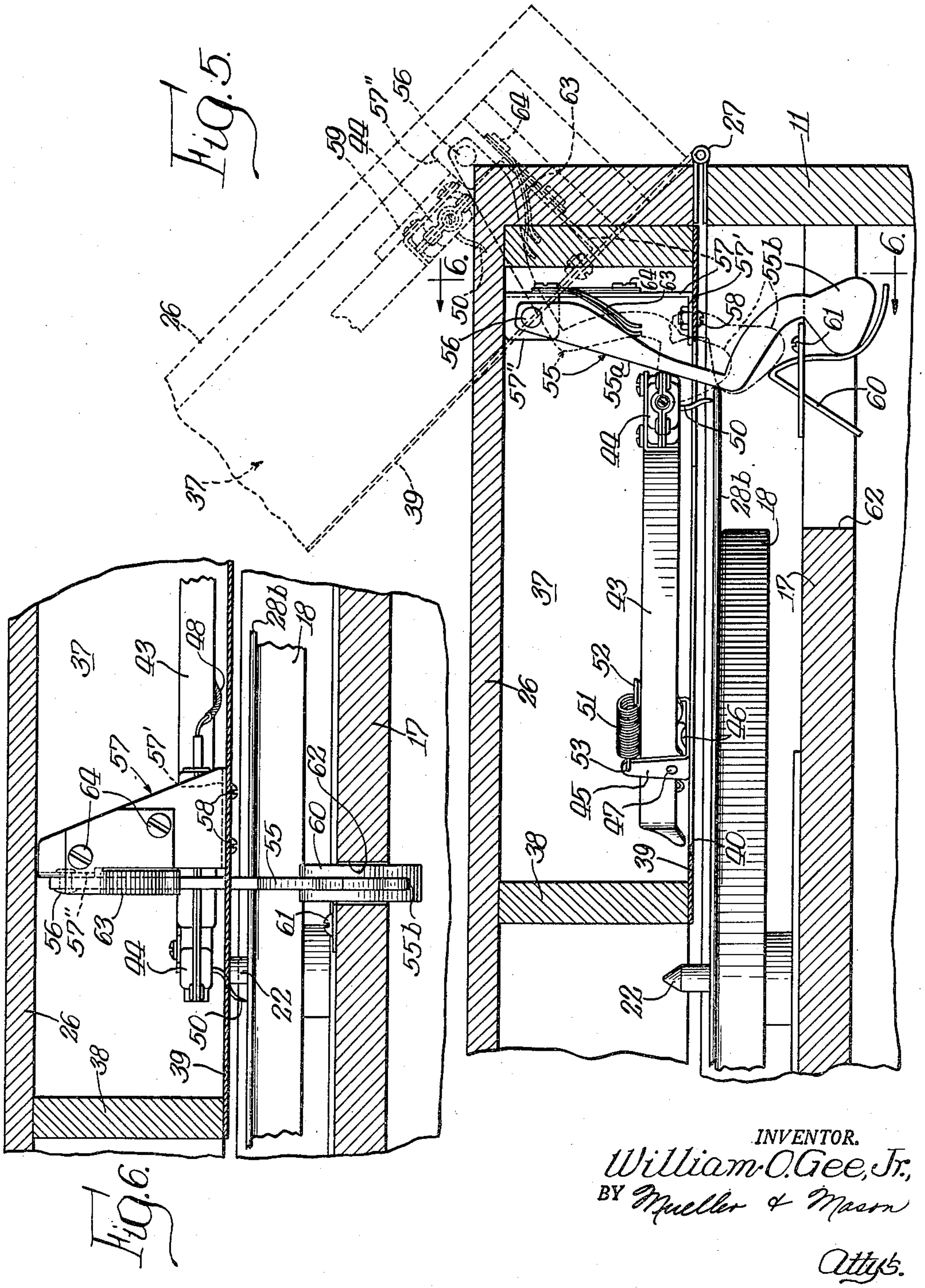
Fig. 5 is a sectional view similar to Fig. 2 with a 12 inch record positioned on the turntable showing the lid in the fully closed and in an intermediate open position.
Fig. 6 is a sectional view taken on line 6—6 of Fig. 5.

In order to bias the pick-up unit control lever to a neutral position such as is shown in Fig. 1 of the drawings, a suitable spring means 63 is provided which is supported from member 57 by means indicated at 64. This spring means 63 is indicated as a leaf spring means but it should be understood that any other suitable biasing means such as the coil spring may be provided if desired. As a matter of fact, a coil spring and lever arrangement is probably more satisfactory in that it will always insure the return of the lever 55 to exactly the same neutral position whereas the leaf spring means such as are illustrated in Fig. 5 of the drawings may lose some of its resiliency and thereby vary the position of the pick-up unit control lever 55. It will become apparent as the following description proceeds that it is very important for the pick-up unit control lever 55 to move to a specific neutral position whenever it is free to do so.

In addition to guiding the pick-up unit in its retracting movement in response to the force of spring 51 when the cover or lid 26 is moved to the open position the pick-up unit control lever 55 and the guide or cam 60 operate to properly position the pick-up unit in dependence upon whether a 10 inch or a 12 inch record is placed upon the turntable. When a 10 inch record 28*a* is placed upon the turntable as is indicated in Fig. 2 of the drawings and the cover or lid 26 is moved to the closed position the shaped portion 55*b* of the pick-up unit control lever 55 by virtue of being moved to the neutral position by spring means 63 engages the lefthand side of the guide 60 as is illustrated in connection with the intermediate position of cover 26 shown in dotted lines in Fig. 2 of the drawings where this lever 55*b* just begins to engage the lefthand side of the guide 60. Continued closing movement of the cover or lid 26 causes the shaped portion 55*b* of the lever 55 to slide along the lefthand side of the guide 60 as viewed in Fig. 2 with the resultant pivoting of the lever 55 about its pivot 56 in a clockwise direction as viewed in Fig. 2 of the drawings. Such clockwise rotation of the lever 55 moves the pick-up unit 43 and consequently the needle 50 so that when the cover 26 is fully closed the needle 50 will engage the initial sound groove of a 10 inch record. It will now be apparent as was mentioned above that the particular shape of the guide 60 and the cam follower portion 55*b* of the lever 55 is very important in producing the desired initial positioning of the pick-up unit when a 10 inch record is positioned on the turntable.

When a 12 inch record such as 28*b* is on the turntable as indicated in Fig. 5 of the drawings and the cover or lid 26 is moved to the closed position the shaped portion 55*b* of the pick-up unit control lever 55 will engage the edge of the record 28*b* as is shown in the dotted uppermost position of the lever 55 in Fig. 5 of the drawings so as to pivot the pick-up unit control lever 55 in a counter-clockwise direction as viewed in Fig. 5. Such counter-clockwise rotation of lever 55 is sufficient to cause the cam follower portion 55*b* thereof to move along the righthand side of guide 60 as viewed in Fig. 5 whereby the pick-up unit 43 with the cartridge 44 sliding along the straight portion 55*a* of the pick-up unit control lever 55 will move to a position such that the needle 50 engages the initial sound groove of a 12 inch record. The position of the shaped portion 55*b* of lever 55 as it engages the end of the guide 60 is also shown in dotted lines in Fig. 5 of the drawings. It will be apparent that this selection of the initial pick-up unit position is made automatically for either 10 or 12 inch records when the cover or lid 26 of the cabinet 11 is closed after placing a 10 inch or a 12 inch record on the turntable.

In view of the fact that the pick-up unit is automatically moved to its proper position on the particular record being played the radio-phonograph combination described above is especially desirable for use by children. Damage to the needle or pick-up unit by the children or scratching of records is completely eliminated. It is common practice to produce certain children's recordings or nursery records, as they may be called on records smaller than the 10 or 12 inch size. As a matter of fact, there is on the market a nursery record which is approximately a 7 inch record. Also home recordings are sometimes made on 6 inch and 8 inch records. However, the great bulk of records sold on the market today are 10 inch and 12 inch records.

Figure 4:
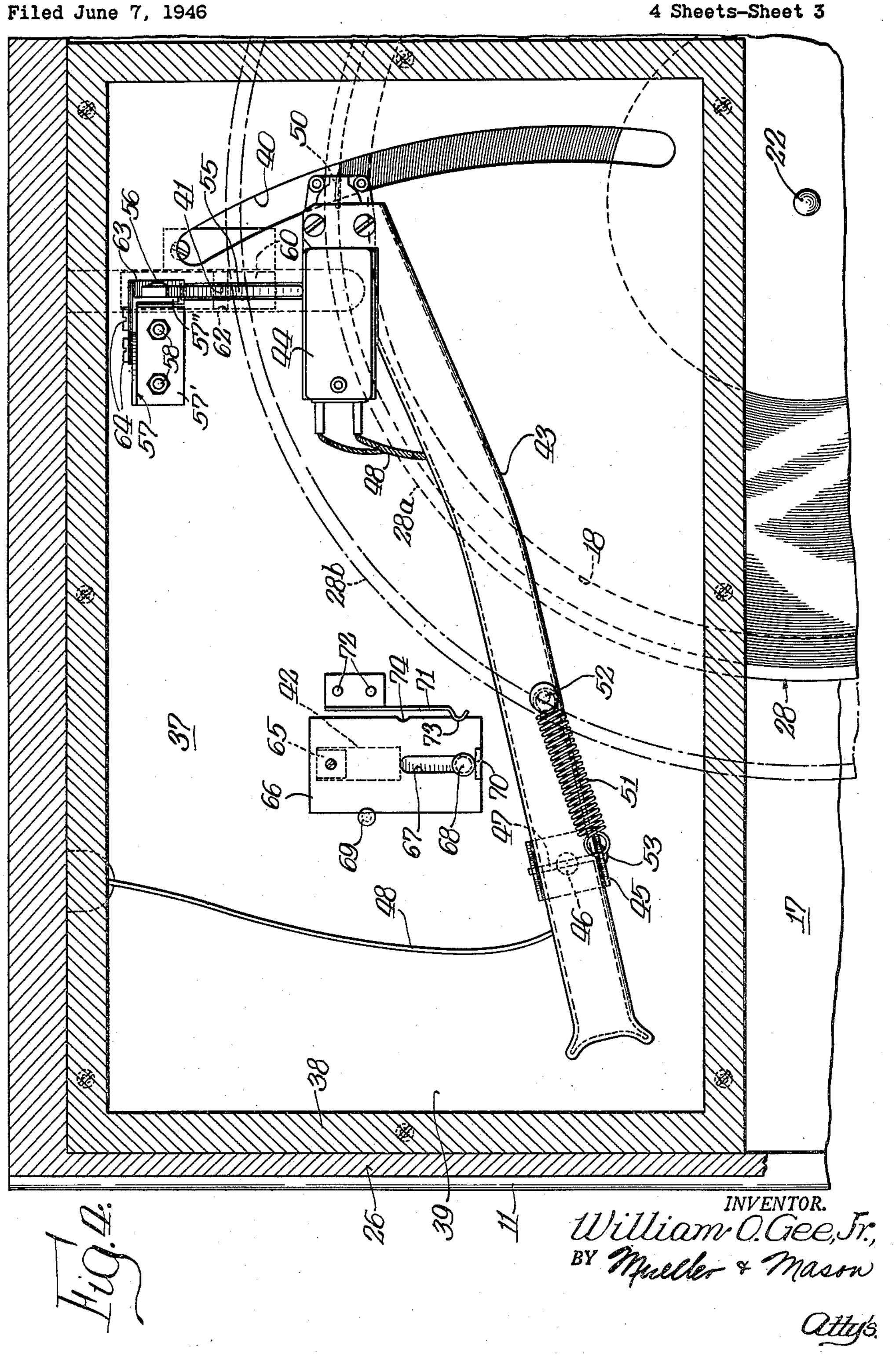
Fig. 4 is a sectional view taken on line 4—4 of Fig. 2 illustrating the pick-up unit in its initial position for playing a 10 inch record with the lid or cover of the phonograph in the closed position.

In order that the record player described above may satisfactorily operate when the 7 inch children's records are placed on the turntable, or for that matter any other record smaller than the standard 10 inch and 12 inch size, a very simple attachment may be provided as is clearly shown in Figs. 1 and 4 of the drawings. This attachment comprises a selector button 65 slidably movable in the slot 42 in the plate 39. This selector button 65 is fastened to and controls the movement of a sliding plate 66 positioned within the enclosure 37. In order to guide the sliding movement of plate 66 it is provided with an elongated slot 67 through which a rivet 68 fastened to plate 39 extends. This rivet 68 limits and guides the sliding movement of the plate 66. To further guide the plate 66 a second rivet 69 may be fastened to the plate 39 so as to engage the edge of the plate 66 as is clearly shown in Fig. 4 of the drawings. The plate 66 is provided with an upwardly extending member 70 preferably integrally formed with plate 66 and bent at right angles thereto. This plate 70 extends upwardly a sufficient distance so as to be capable of engaging the arm 43 in whatever position it may assume with reference to movement about its pivot 47 and perform the same function as the straight portion 55*a* of the pick-up unit control lever 55 when the selector button 65 is moved to the position for playing records other than the 10 inch and 12 inch records.

In Fig. 1 of the drawings the button 65 is illustrated as selectively controlling the playing of either 10 inch and 12 inch records or 7 inch records. It should be understood that this button might equally well control the record player so as to play 6 inch or 8 inch records and the specific illustrated embodiment is by way of example only. When the button 65 is moved to its uppermost position as viewed in Fig. 1 or toward the arm or lever 43 as viewed in Fig. 4 it engages the arm 43 and moves it about pivot 47 so that when the cover or lid 26 is closed the stylus 50 will engage the initial sound groove of a 7 inch record. A suitable detent 71 fastened to the plate 39 as indicated at 72 is adapted to engage one or the other of the notches 73 or 74 in the sliding plate 66 to hold the sliding plate in certain predetermined positions. When the sliding plate 66 is in the position shown in Fig. 4 of the drawings the arm or lever 43 is free to be controlled entirely by the pick-up unit control lever 55 and the notch 73 engaging with the detent 71 insures that the sliding plate 66 will remain in this position. When it is desired to play a 7 inch record, for example, the sliding plate 66 through manipulation of the knob 65 is moved toward the arm or lever 43 until the detent 71 engages the notch 74. In this position the pick-up unit control lever 55 no longer engages the cartridge 44, but instead the arm or lever 43 slides along the vertical portion 70 integrally formed with sliding plate 66. When the cover is moved to the open position shown in Fig. 1 and with the button 65 moved to play 7 inch records the pick-up unit will move along the vertical extension 70 as the cover approaches its open position under the influence of retracting spring 51 so that the stylus 50 is fully retracted within the enclosure 39.

It will be understood that merely by providing additional notches, such as 73 and 74 along the sliding plate 66 the record player may be employed to play records other than 7 inch, 10 and 12 inch records. In any event a manual selection of smaller sized records may be made by means of button 65 and when button 65 is moved to the lowermost position shown in Fig. 1 of the drawings the pick-up unit control lever 55 will automatically select the positioning of the pick-up unit for either 10 or 12 inch records depending upon the particular record placed on the turntable.

In view of the detailed description included above, the operation of the radio-phonograph combination, and particularly the record player of the present invention will be obvious to those skilled in the art and no further discussion thereof is included herewith. It will be apparent that a record player has been provided in which the records are placed on a turntable in the same manner as has been done for many years. However, after placing the record on the turntable all the operator has to do is to close the cover or lid and the pick-up unit will be moved to the proper position for playing the records. This movement of the pick-up unit is automatically controlled for 10 or 12 inch records which form the great bulk of the records sold today. In the event a different sized record is to be played a manual selecting means is provided so that merely by moving a small button the operator can close the lid and the record player will function just the same as before with the pick-up unit moving to its proper position on the record on the turntable. It will be apparent that to replay a record on the turntable the operator merely must open and reclose the cover 26.

The record player described above is especially useful in connection with children's radio-phonograph combinations by virtue of the fact that the problem which was difficult for children, namely placing the needle on the record to be played without scratching the record, without damaging the needle or pick-up unit and without injuring the child is completely eliminated. Furthermore, with the present invention the new and improved record player is very simple and compact and it costs no more to manufacture and perhaps even less than the conventional record player employed heretofore. Furthermore, the structure and parts thereof are sturdy and foolproof in operation so that long years of service from such a record player without trouble can be expected.

It should be understood that the present invention is not limited to the specific details and arrangement thereof herein illustrated and it is intended in the appended claims to cover all changes and modifications that fall within the true spirit and scope of the present invention.

What is claimed as new and desired to be secured by Letters Patent of the United States is:

1. In a record player the combination of a cabinet including a hinged lid therefor, a turntable adapted to receive a disk record positioned in said cabinet and accessible upon opening said lid, a pick-up unit supported by said lid, and movable sensing means carried by said lid, said sensing means being responsive to the size of the record on said turntable and cooperating with said pick-up unit for positioning said pick-up unit on the record concurrently with the closing of said lid.

2. In a phonograph, a cabinet, a cover for said cabinet hinged thereto, a rotatable turntable positioned in said cabinet and accessible upon opening said cover, said turntable being adapted to receive disk type records, an enclosure comprising sides defining an enclosed space within said cover, a pick-up unit including a stylus positioned in said enclosure, said enclosure having an opening in one side thereof to permit the stylus of said pick-up unit to engage a record on said turntable when said cover is in the closed position, and movable sensing means carried by said cover, said sensing means being responsive to the size of the record on said turntable and cooperating with said pick-up unit so as to automatically position said pick-up unit at the beginning of the record concurrently with the closing of said cover.

3. In a radio phonograph combination, a cabinet, a cover for said cabinet hinged thereto, a rotatable turntable positioned in said cabinet and accessible upon opening said cover, said turntable being adapted to support either a ten inch or a twelve inch disk record for reproduction thereof, an enclosure comprising sides defining an enclosed space within said cover, a pick-up unit including a needle in said enclosure, said enclosure having an opening in one side thereof to permit the needle of said pick-up unit to engage a record on said turntable when said cover is in the closed position, means including a device for directly sensing the edge of the record on said turntable and responsive to the size of the record for controlling the positioning of said needle on said record upon the closing of said cover, whereby said needle is automatically positioned at the beginning of a particular record placed on said turntable, and means for retracting said needle and pick-up unit when said cover is open to prevent injury to the operator.

4. In a record player comprising a cabinet having a rotatable turntable mounted therein, said turntable being adapted to receive disk type records, a cover hinged to said cabinet, a pick-up unit including a stylus pivotally supported on said cover, an enclosure comprising sides defining an enclosed space within said cover for said pick-up unit, said enclosure having an opening in one side thereof through which said stylus may extend, means for retracting said stylus from said opening when said cover is open, and means responsive to the closing of said cover for moving said pick-up unit to cause said stylus to engage one of the initial sound grooves in a record positioned on said turntable.

5. A record player comprising a cabinet having an opening at the top, a cover for said cabinet hinged thereto and adapted to close said opening, a rotatable turntable positioned in said cabinet and accessible upon opening said cover, said turntable being adapted to support a disk type record thereon, an enclosure comprising sides defining an enclosed space within said cover, a pick-up unit pivotally mounted in said enclosure, a needle associated with said pick-up unit, said enclosure having an opening in one side thereof to permit the needle of said pick-up unit to engage a record on said turntable when said cover is moved to the closed position, a pick-up unit control lever pivotally mounted in said enclosure and having a portion extending outside of said enclosure, a guide positioned in said cabinet so as to engage said portion, when said cover is moved to the closed position, said guide being so constructed as to move said lever in either one of two directions, and means on said lever engageable by a predetermined sized record on said turntable for causing said guide to move said lever in a predetermined one of said directions.

6. A record player comprising a cabinet having an opening at the top, a cover for said cabinet hinged thereto and adapted to close said opening, a rotatable turntable positioned in said cabinet and accessible upon opening said cover, said turntable being adapted to support a disk type record thereon, an enclosure comprising sides defining an enclosed space within said cover, a pick-up unit pivotally mounted in said enclosure, a needle associated with said pick-up unit, said enclosure having an opening in one side thereof to permit the needle of said pick-up unit to engage a record on said turntable when said cover is moved to the closed position, a lever pivotally mounted in said enclosure for controlling the movement of said pick-up unit and having a portion extending outside of said enclosure, means for normally moving said lever to a neutral position, means in said cabinet for engaging said portion of said lever when said cover is moved to the closed position so as to move said lever in one direction from said neutral position to position said pick-up unit, and means on said lever engageable by a predetermined sized record on said turntable when said cover is moved to the closed position for moving said lever in the other direction from said neutral position whereby said portion engages said engaging means in such a manner as further to move said lever in said other direction whereby automatically to position said needle at the beginning of the particular record placed on said turntable.

7. In a record player comprising, a cabinet, a cover for said cabinet hinged thereto, a rotatable turntable positioned in said cabinet and accessible upon opening said cover, said turntable being adapted to receive disk type records, an enclosure comprising sides defining an enclosed space within said cover, a pick-up unit including a needle pivotally supported for universal motion in said enclosure so that the movement thereof relative to said cover during the opening and closing operation of said cover is dependent upon the force of gravity, said enclosure having an opening in one side thereof to permit the needle of said pick-up unit to engage the sound groove in a record on said turntable when said cover is moved to the closed position, and means for retracting said needle from said opening when said cover is moved to the open position to prevent accidental engagement of the operator with either said needle or said pick-up unit.

8. In a record player comprising, a cabinet, a cover for said cabinet hinged thereto, a rotatable turntable positioned in said cabinet and accessible upon opening said cover, said turntable being adapted to receive disk type records, an enclosure comprising sides defining an enclosed space within said cover, a pick-up unit including a needle pivotally supported for universal motion in said enclosure so that the movement thereof relative to said cover during the opening and closing operation of said cover is dependent upon the force of gravity, said enclosure having an opening in one side thereof to permit the needle of said pick-up unit to engage the sound groove in a record on said turntable when said cover is moved to the closed position, and tension spring means for retracting said needle from said opening when said cover is moved toward the open position sufficiently so that the force of said spring means overcomes the force of gravity tending to move the needle of said pick-up unit toward said opening thereby to prevent accidental engagement of the operator with either said needle or said pick-up unit.

9. In a phonograph the combination of a cabinet including a hinged lid therefor, a turntable positioned in said cabinet and accessible upon opening said lid, motive means for rotating said turntable, a pick-up unit including a needle supported by said lid, movable sensing means carried by said lid, said sensing means being responsive to the size of the record on said turntable and cooperating with said pick-up unit for positioning said pick-up unit concurrently with the closing of said lid, whereby said needle is automatically positioned at the beginning of the particular record to be played on said turntable, and means responsive to the closing of said lid for rendering said motive means effective to rotate said turntable.

10. In a phonograph the combination of a cabinet including a hinged lid therefor, a turntable positioned in said cabinet and accessible upon opening said lid, motive means for rotating said turntable, a pick-up unit including a needle supported by said lid, movable sensing means carried by said lid, said sensing means being responsive to the size of the record on said turntable and cooperating with said pick-up unit for positioning said pick-up unit concurrently with the closing of said lid, whereby said needle is automatically positioned at the beginning of the particular record to be played on said turntable, means responsive to the closing of said lid for rendering said motive means effective to rotate said turntable, and means for automatically positioning said pick-up unit upon opening said lid so that accidental engagement of said needle with the operator is substantially impossible.

11. In a record player comprising, a cabinet, a cover for said cabinet hinged thereto, a rotatable turntable positioned in said cabinet and accessible upon opening said cover, said turntable being adapted to receive disk type records, an enclosure comprising sides defining an enclosed space within said cover, a pick-up unit including a needle pivotally supported for universal motion in said enclosure so that the movement thereof relative to said cover during the opening and closing operation of said cover is dependent upon the force of gravity, said enclosure having an opening in one side thereof to permit the needle of said pick-up unit to engage the sound groove in a record on said turntable when said cover is moved to the closed position, and movable sensing means carried by said cover, said sensing means being responsive to the size of the record on said turntable and effective to automatically position said needle in substantially the initial sound groove of said record concurrently with the closing of said cover regardless of whether a ten inch or twelve inch record is placed on said turntable.

12. In a record player comprising, a cabinet, a cover for said cabinet hinged thereto, a rotatable turntable positioned in said cabinet and accessible upon opening said cover, said turntable being adapted to receive disk type records, an enclosure comprising sides defining an enclosed space within said cover, a pick-up unit including a needle pivotally supported for universal motion in said enclosure so that the movement thereof relative to said cover during the opening and closing operation of said cover is dependent upon the force of gravity, said enclosure having an opening in one side thereof to permit the needle of said pick-up unit to engage the sound groove in a record on said turntable when said cover is moved to the closed position, means for retracting said needle from said aperture when said cover is moved to the open position to prevent accidental engagement of the operator with either said needle or said pick-up unit, and cooperating means associated with said cover and said cabinet and operative upon closing said cover for automatically positioning said needle in substantially the initial sound groove of the record on said turntable regardless of whether said record is a ten inch or a twelve inch record.

13. In a record player comprising, a cabinet, a cover for said cabinet hinged thereto, a rotatable turntable positioned in said cabinet and accessible upon opening said cover, said turntable being adapted to receive disk type records, an enclosure comprising sides defining an enclosed space within said cover, a pick-up unit including a needle pivotally supported for universal motion in said enclosure so that the movement thereof relative to said cover during the opening and closing operation of said cover is dependent upon the force of gravity, said enclosure having an opening in one side thereof to permit the needle of said pick-up unit to engage the sound groove in a record on said turntable when said cover is moved to the closed position, and cooperating means associated with said cover and said cabinet including sensing means responsive to the size of the record on said turntable and operative concurrently with the closing of said cover for automatically positioning said needle in substantially the initial sound groove of the record on said turntable regardless of whether said record is a ten inch inch or a twelve inch record.

14. In a phonograph the combination of a cabinet including a hinged lid therefor, a turntable positioned in said cabinet and accessible upon opening said lid, a pick-up unit including a needle supported by said lid, and cooperating means associated with said lid and said cabinet including sensing means responsive to the size of a record placed on said turntable and cooperatively operable concurrently with the closing of said lid for automatically positioning said needle in substantially the initial sound groove of the record on said turntable regardless of whether said record is a ten inch or a twelve inch one.

WILLIAM O. GEE, JR.

REFERENCES CITED

The following references are of record in the file of this patent:

UNITED STATES PATENTS

| Number | Name | Date |
|---|---|---|
| 1,429,839 | Boswell | Sept. 19, 1922 |
| 1,532,811 | Graham | Apr. 7, 1925 |
| 1,711,666 | Adams | May 7, 1929 |
| 2,166,986 | Dally | July 25, 1939 |
| 2,334,649 | Recker | Nov. 16, 1943 |